US008851994B2

United States Patent
Saito et al.

(10) Patent No.: US 8,851,994 B2
(45) Date of Patent: Oct. 7, 2014

(54) GAME DEVICE, GAME CONTROL METHOD, AND GAME CONTROL PROGRAM ADAPTED TO CONTROL GAME BY USING POSITION AND POSTURE OF INPUT DEVICE

(75) Inventors: Naoyuki Saito, Chiba (JP); Hideki Kinoshita, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 40 days.

(21) Appl. No.: 13/257,755

(22) PCT Filed: Nov. 22, 2010

(86) PCT No.: PCT/JP2010/006819
§ 371 (c)(1), (2), (4) Date: Dec. 21, 2011

(87) PCT Pub. No.: WO2012/001754
PCT Pub. Date: Jan. 5, 2012

(65) Prior Publication Data
US 2013/0095919 A1    Apr. 18, 2013

(30) Foreign Application Priority Data
Jun. 30, 2010 (JP) ................................. 2010-150003

(51) Int. Cl.
*A63F 13/00* (2014.01)
*G09G 5/00* (2006.01)
*A63F 13/40* (2014.01)
*A63F 13/219* (2014.01)
*A63F 13/20* (2014.01)
*G06F 3/0346* (2013.01)
*G06F 3/03* (2006.01)

(52) U.S. Cl.
CPC ......... *A63F 13/06* (2013.01); *A63F 2300/1093* (2013.01); *A63F 13/10* (2013.01); *A63F 2300/105* (2013.01); *A63F 13/04* (2013.01); *A63F 2300/6045* (2013.01); *G06F 3/0346* (2013.01); *A63F 2300/8076* (2013.01); *G06F 3/0304* (2013.01)
USPC ................................ 463/37; 345/156; 463/36

(58) Field of Classification Search
USPC .............. 345/660; 348/222.1; 463/31, 37, 43; 702/104
See application file for complete search history.

(56) References Cited

U.S. PATENT DOCUMENTS 5,618,179 A * 4/1997 Copperman et al. ............ 434/69
6,104,158 A * 8/2000 Jacobus et al. ........... 318/568.11

(Continued)

FOREIGN PATENT DOCUMENTS

EP          0948979 A2    10/1999
JP       2007-289529    * 11/2007    .............. A63F 13/06

(Continued)

OTHER PUBLICATIONS

International Search Report and Written Opinion for corresponding PCT application PCT/JP2010/006819, dated Dec. 28, 2010.

(Continued)

*Primary Examiner* — Dmitry Suhol
*Assistant Examiner* — Jason Yen
(74) *Attorney, Agent, or Firm* — Matthew B. Dernier, Esq.; Gibson & Dernier LLP

(57) ABSTRACT

A game device is provided with a position acquisition unit for acquiring the position of an input device for moving the position of a given object on a screen displayed on a display device; an inclination acquisition unit for acquiring the inclination of the input device; and a position computation unit for determining the position of the object on the screen based on both a positional displacement amount of the input device and an inclination displacement amount of the input device.

12 Claims, 15 Drawing Sheets

(56) References Cited

U.S. PATENT DOCUMENTS

| | | | |
|---|---|---|---|
| 2004/0207597 A1* | 10/2004 | Marks | 345/156 |
| 2005/0202870 A1* | 9/2005 | Kawamura | 463/36 |
| 2007/0060385 A1* | 3/2007 | Dohta | 463/43 |
| 2007/0211050 A1* | 9/2007 | Ohta | 345/426 |
| 2007/0254738 A1* | 11/2007 | Sato | 463/31 |
| 2007/0265085 A1* | 11/2007 | Miyamoto et al. | 463/37 |
| 2007/0265088 A1* | 11/2007 | Nakada et al. | 463/37 |
| 2007/0270222 A1* | 11/2007 | Yamanaka et al. | 463/37 |
| 2008/0001951 A1* | 1/2008 | Marks et al. | 345/474 |
| 2008/0120057 A1* | 5/2008 | Fukushima et al. | 702/104 |
| 2008/0198129 A1* | 8/2008 | Cheng et al. | 345/156 |
| 2008/0220867 A1* | 9/2008 | Zalewski et al. | 463/37 |
| 2008/0309618 A1 | 12/2008 | Okada | |
| 2009/0085935 A1* | 4/2009 | Yamashita et al. | 345/660 |
| 2010/0009761 A1* | 1/2010 | Ohta | 463/43 |
| 2010/0178988 A1* | 7/2010 | Izuno et al. | 463/43 |
| 2010/0194907 A1* | 8/2010 | Yamaguchi et al. | 348/222.1 |
| 2010/0240429 A1* | 9/2010 | Chosogabe | 463/3 |
| 2010/0304857 A1* | 12/2010 | Suzuki et al. | 463/31 |
| 2010/0331091 A1* | 12/2010 | Dohta | 463/43 |

FOREIGN PATENT DOCUMENTS

| | | |
|---|---|---|
| JP | 2007289529 A | 11/2007 |
| JP | 2009087145 A | 4/2009 |
| JP | 2010019751 A | 1/2010 |

OTHER PUBLICATIONS

Office Action for corresponding JP Patent Application No. 2011-509742, dated Oct. 2, 2012.

International Preliminary Report on Patentability and Written Opinion for corresponding PCT Application No. PCT application PCT/JP2010/006819, dated Jan. 8, 2013.

Office Action for corresponding Japanese Patent Application No. 2011-509742, dated Jun. 11, 2013.

European Search Report for corresponding EP Application No. 10854051, dated Jul. 2, 2014.

PlayStation Move, Wikipedia, the free encyclopedia, http://en.wikipedia.org/wiki/PlayStation_Move, pp. 1-19, retrieved Aug. 5, 2014.

* cited by examiner

GAME DEVICE, GAME CONTROL METHOD, AND GAME CONTROL PROGRAM ADAPTED TO CONTROL GAME BY USING POSITION AND POSTURE OF INPUT DEVICE

TECHNICAL FIELD

The present invention relates to game control technology and, more particularly, to a game device, game control method, and game control program adapted to control a game by using the position and posture of an input device as an operation input.

BACKGROUND ART

A directional key and an analog stick are commonly used as input interfaces for moving characters or objects in a two-dimensional game screen or in a three-dimensional game field. In recent years, input interfaces have been introduced where a player holds a remote controller capable of performing wireless communication with a game device and inputs a direction of movement by, for example, tilting the controller.

[Patent document No. 1] US Patent Publication No. 2008/0120057

SUMMARY OF THE INVENTION

The inventors of the present invention have found a technique for further improving the user-friendliness of game players in an input interface where the position and posture of an input device is used as an operation input so as to input a direction of movement.

In this background, a purpose of the present invention is to provide game control techniques with high user-friendliness.

An embodiment of the present invention relates to a game control program. The game control program embedded in a computer-readable medium comprises: a module of acquiring the position of an input device for moving the position of a given object on a screen displayed on a display device; a module of acquiring the inclination of the input device; and a module of determining the position of the object on the screen based on both a positional displacement amount of the input device and an inclination displacement amount of the input device.

Optional combinations of the aforementioned constituting elements, and implementations of the invention in the form of methods, apparatuses, and systems may also be practiced as additional modes of the present invention.

The present invention can provide a game control technique with high user-friendliness.

DETAILED DESCRIPTION OF THE INVENTION

In the embodiment, a detailed description will be made regarding a technique for moving an object on a game screen by using an input device capable of detecting information on a position and a posture. A game device determines the position of the object based on both a positional displacement amount of the input device and an inclination displacement amount of the input device. Therefore, the player can move the object by moving or tilting the input device from side to side or up and down. The game device determines the position of the object based on a value obtained by adding the positional displacement amount and the inclination displacement amount of the input device after assigning a weight to each of the displacement amounts. The weight assigned to the positional displacement amount is larger than the weight assigned to the inclination displacement amount. This allows the player to move the object also by moving the input device. Further, when the player wishes to move the object widely, the object can be easily moved by widely tilting the input device instead of widely moving the input device.

Figure 1:
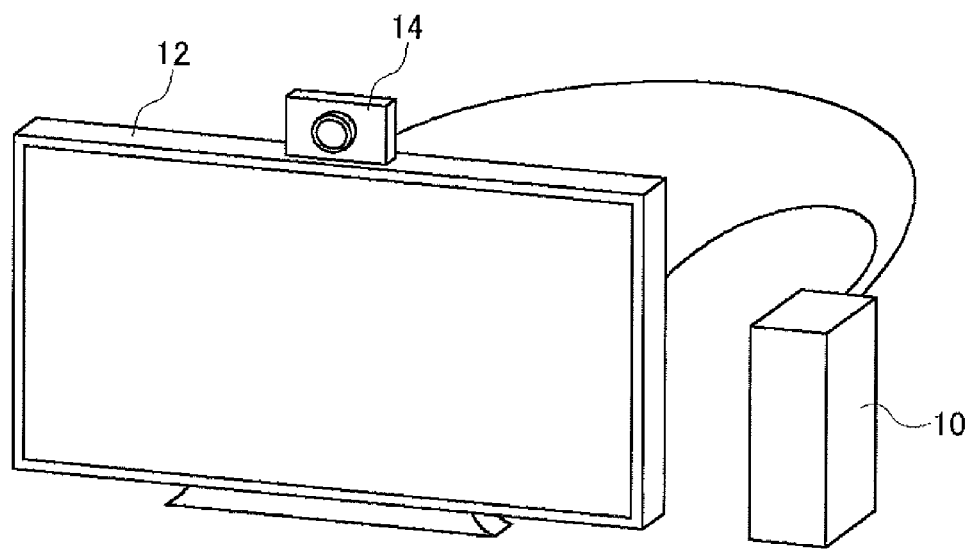
FIG. 1 is a diagram illustrating a usage environment of a game system according to an exemplary embodiment of the present invention.
Figure 1:
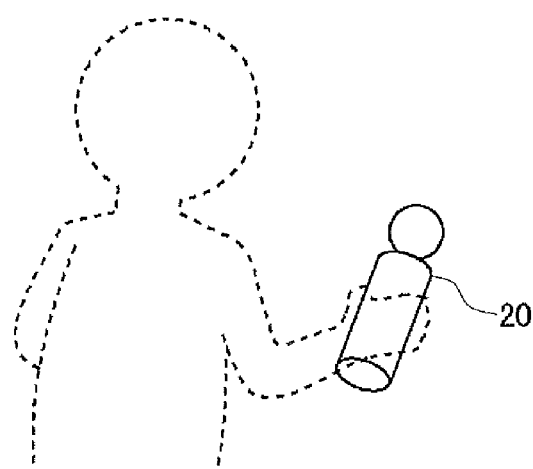

FIG. 1 illustrates a usage environment of a game system 1 according to an exemplary embodiment of the present invention. The game system 1 is provided with a game device 10 that runs game software, a display device 12 that outputs a processing result by the game device 10, an input device 20, and an image-capturing device 14 that captures the image of the input device 20.

The input device 20 is an operation input device for a user to input an operation instruction, and the game device 10 is a processing device that processes a game application based on the operation instruction provided through the input device 20 and generates an image signal that indicates the processing result of the game application.

The input device 20 has a function of transmitting the operation instruction from the user to the game device 10, and in the exemplary embodiment, the input device 20 is configured as a wireless controller capable of performing wireless communication with the game device 10. The input device 20 and the game device 10 may establish a wireless connection by using Bluetooth (registered trademark) protocol. The input device 20 is not limited to a wireless controller and may be a wired controller that is connected to the game device 10 via a cable.

The input device 20 is activated by a battery and is configured with a plurality of buttons for entering an operation instruction to progress a game. When the user operates the button of the input device 20, the operation instruction is wirelessly transmitted to the game device 10. The game device 10 receives the operation instruction from the input device 20, controls the game progress in accordance with the operation instruction, and generates a game image signal. The generated game image signal is output by a display device 12.

The image-capturing device 14 is a video camera constituted with a CCD imaging element, a CMOS imaging element, or the like, captures the image of the real space at a predetermined interval, and generates a frame image for each interval. For example, the imaging rate of the image-capturing device 14 may be set to be 30 frames per second and be identical with the frame rate of the display device 12. The image-capturing device 14 is connected to the game device 10 via a USB (Universal Serial Bus) or other interfaces.

The display device 12 is a display for outputting an image and displays a game screen upon the reception of the image signal generated in the game device 10. The display device 12 may be a TV having a display and a speaker or may be a computer display. The display device 12 may be connected to the game device 10 via a wired cable or wirelessly via a wireless LAN (Local Area Network) or the like.

In the game system 1 of the present exemplary embodiment, the input device 20 has an illuminator. During game play, the illuminator emits light in a predetermined color, and the image thereof is captured by the image-capturing device 14. The image-capturing device 14 captures the image of the input device 20. The image-capturing device 14 then generates a frame image and provides the frame image to the game device 10. The game device 10 acquires the frame image and derives positional information of the illuminator in the real space based on the position and size of the image of the illuminator in the frame image. The game device 10 uses the positional information as an operation instruction of the game and incorporates the information in processing the game by, for example, controlling the movement of a player character. The game device 10 of the present exemplary embodiment has a function of processing a game application, as well as an operation input through a button or the like of the input device 20, by using the acquired positional information of the image of the illuminator.

The illuminator of the input device 20 is configured so that the illuminator is capable of emitting light in a plurality of colors. The illuminator can change a light-emission color based on a light-emission instruction from the game device 10.

The input device 20 has an acceleration sensor and a gyro sensor. The detection value of a sensor is transmitted to the game device 10 at a predetermined interval. The game device 10 acquires the detection value of the sensor so as to acquire the information on the posture of the input device 20 in the real space. The game device 10 uses the information on the posture as an operation instruction of the game and incorporates the information in processing the game. As described above, the game device 10 of the present exemplary embodiment has a function of processing a game application by using the acquired information on the posture of the input device 20.

Figure 2A:
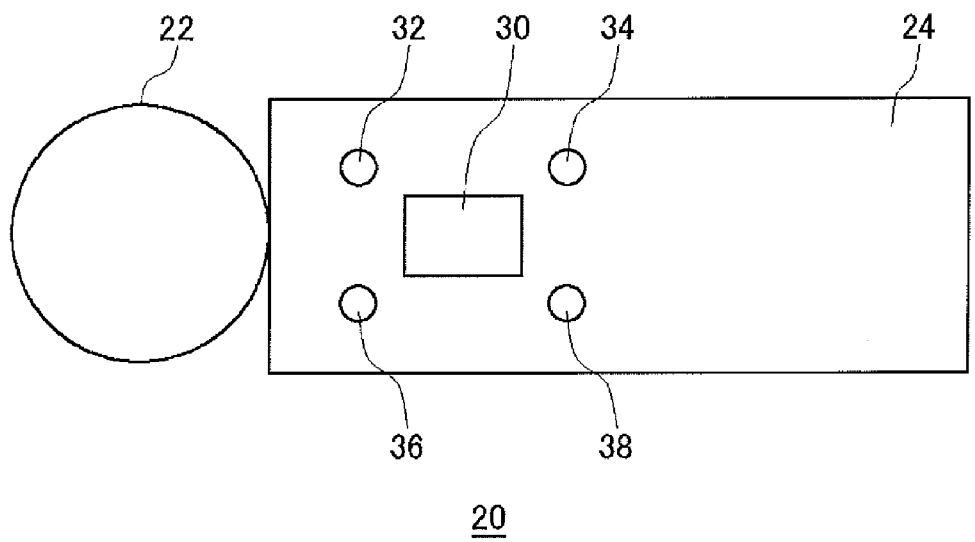
FIG. 2 is a diagram illustrating the exterior configuration of an input device.
Figure 2B:
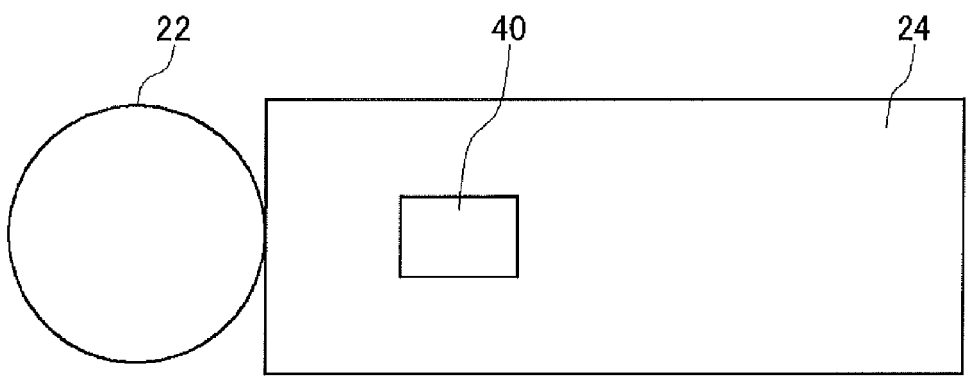

FIG. 2 illustrates the exterior configuration of the input device 20. FIG. 2A shows the upper-surface configuration of the input device 20, and FIG. 2B shows the lower-surface configuration of the input device 20. The input device 20 has an illuminator 22 and a handle 24. The illuminator 22 has the external side that is formed, into a sphere, of a resin having light permeability and has a light-emitting element such as a light-emitting diode, an electric bulb, or the like on the inside. When the light-emitting element in the inside emits light, the entire outer sphere glows. Operation buttons 30, 32, 34, 36, and 38 are provided on the upper surface of the handle 24, and an operation button 40 is provided on the lower surface thereof. The user operates the operation button 30, 32, 34, 36, and 38 with his/her thumb and the operation button 40 with his/her index finger while holding the edge portion of the handle 24 with his/her hand. The operation buttons 30, 32, 34, 36, and 38 are configured to be push-type buttons, and the user operates the buttons by pushing them down. The operation button 40 may allow for the entry of an analog quantity.

The user plays a game while looking at the game screen displayed on the display device 12. Preferably, the image-capturing device 14 is arranged such that the area defined by the imaging range thereof faces the same direction as that of the display device 12 since the image-capturing device 14 needs to capture the image of the illuminator 22 when a game application is running. Since the user often plays a game in front of the display device 12 in general, the image-capturing device 14 is arranged such that the direction of the light axis thereof matches the front direction of the display device 12. More specifically, the image-capturing device 14 is preferably arranged near the display device 12 such that a position where the user can view the display screen of the display device 12 is included in the imaging range of the image-capturing device 14. This allows the image-capturing device 14 to capture the image of the input device 20.

Figure 3:
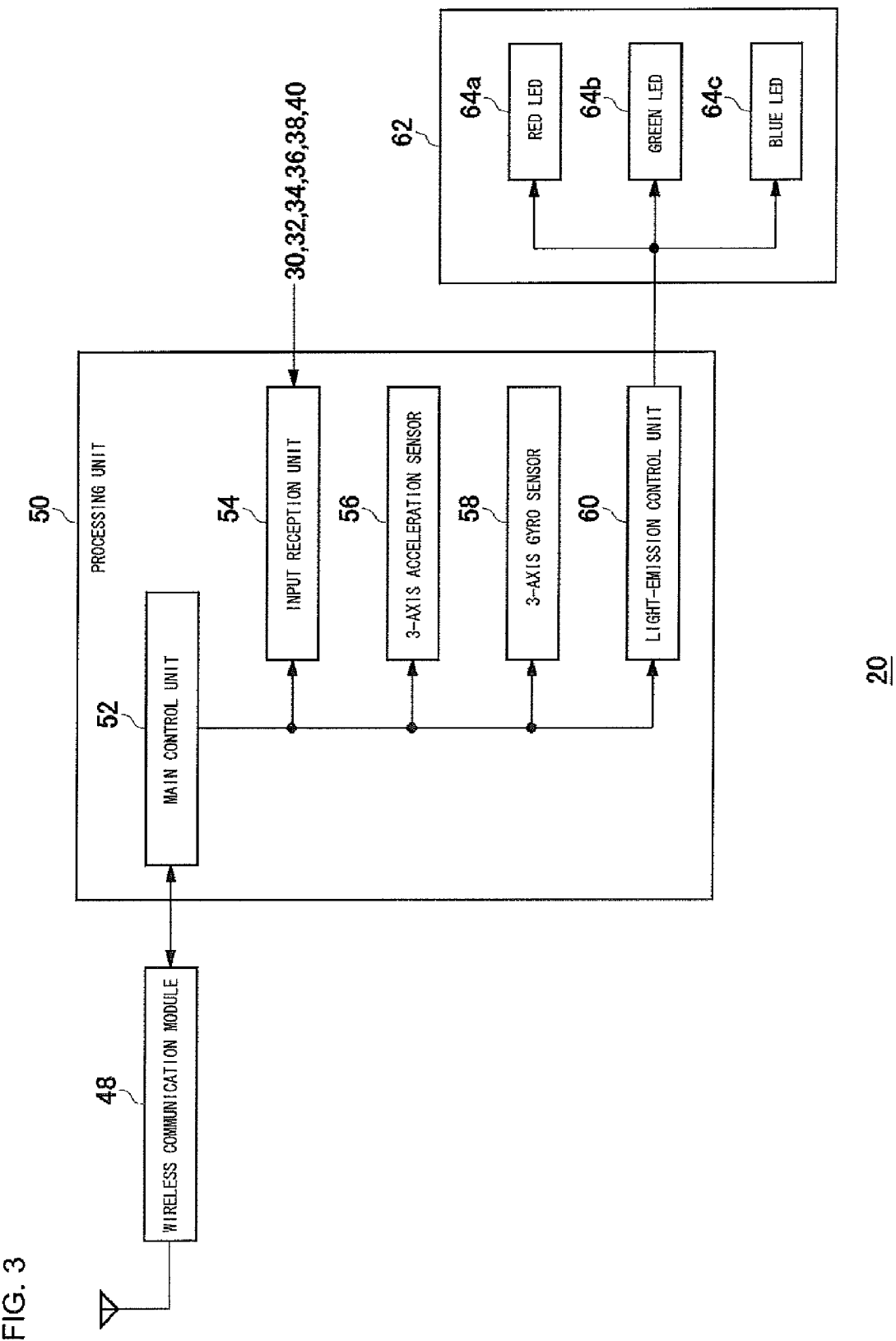
FIG. 3 is a diagram illustrating the internal configuration of the input device.

FIG. 3 illustrates the internal configuration of the input device 20. The input device 20 is provided with a wireless communication module 48, a processing unit 50, a light-emitting unit 62, and operation buttons 30, 32, 34, 36, 38, and 40. The wireless communication module 48 has a function of transmitting and receiving data to and from the wireless communication module of the game device 10. The processing unit 50 performs a desired process in the input device 20.

The processing unit 50 has a main control unit 52, an input reception unit 54, a 3-axis acceleration sensor 56, a 3-axis gyro sensor 58, and a light-emission control unit 60. The main control unit 52 transmits and receives necessary data to and from the wireless communication module 48.

The input reception unit 54 receives the input information through the operation buttons 30, 32, 34, 36, 38, and 40 and transmits the input information to the main control unit 52. The 3-axis acceleration sensor 56 detects acceleration components in three axes, X, Y, and Z. The 3-axis gyro sensor 58 detects angular velocities on an XZ plane, a ZY plane, and a YX plane. The width direction, the height direction, and the longitudinal direction of the input device 20 are set to be an X axis, a Y axis, and a Z axis, respectively. Preferably, the 3-axis acceleration sensor 56 and the 3-axis gyro sensor 58 are arranged in the handle 24 of the input device 20 near the center of the inside of the handle 24. The wireless communication module 48 transmits information on a detection value obtained by the 3-axis acceleration sensor 56 and information on a detection value obtained by the 3-axis gyro sensor 58, along with the input information obtained through the operation buttons, to the wireless communication module of the game device 10 at a predetermined interval. The transmission interval is set to be, for example, 11.25 msec.

The light-emission control unit 60 controls the light emission of the light-emitting unit 62. The light-emitting unit 62 has a red LED 64a, a green LED 64b, and a blue LED 64c and allows light to be emitted in a plurality of colors. The light-emission control unit 60 allows the light-emitting unit 62 to emit light in a desired color by adjusting the light emission of the red LED 64a, the green LED 64b, and the blue LED 64c.

Upon the receipt of a light-emission instruction from the game device 10, the wireless communication module 48 provides the light-emission instruction to the main control unit 52, and the main control unit 52 provides the light-emission instruction to the light-emission control unit 60. The light-emission control unit 60 controls the light emission of the red LED 64a, the green LED 64b, and the blue LED 64c so that the light-emitting unit 62 emits light in a color specified by the light-emission instruction. For example, the light-emission control unit 60 may control lighting of each LED by PWM (Pulse Width Modulation) control.

Figure 4:
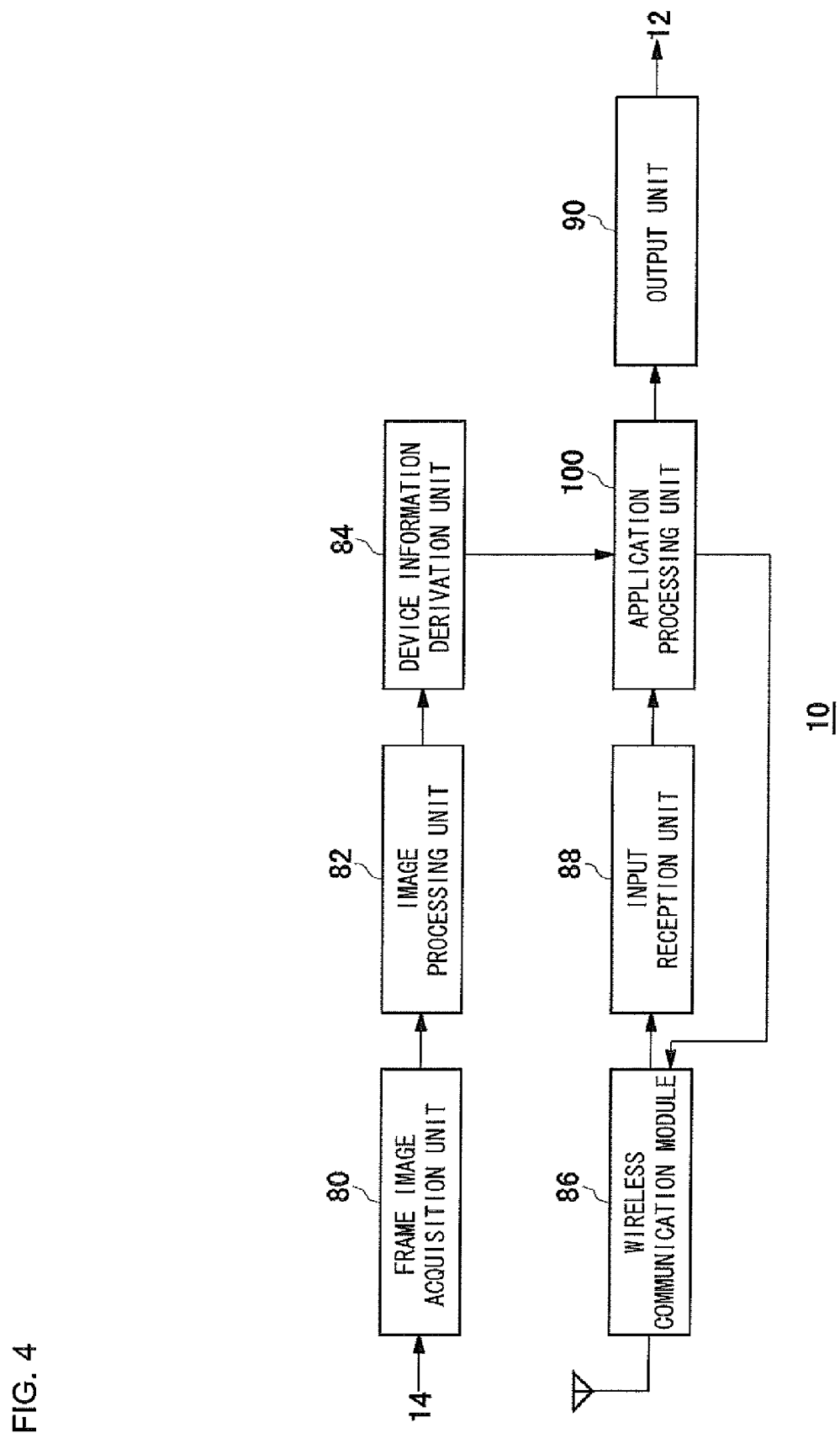
FIG. 4 is a diagram illustrating the configuration of a game device.

FIG. 4 illustrates the configuration of the game device 10. The game device 10 is provided with a frame image acquisition unit 80, an image processing unit 82, a device information derivation unit 84, a wireless communication module 86, an input reception unit 88, an output unit 90, and an application processing unit 100. The processing functions according to the embodiment are implemented by any CPU, memory or a program loaded into the memory. Configurations are implemented by the cooperation of hardware components. The program may be built in the game device 10 or may be provided from outside being stored in the recording medium. Thus, a person skilled in the art should appreciate that there are many ways of accomplishing these functional blocks in various forms in accordance with the components of hardware only, software only, or the combination of both. The game device 10 may have a plurality of CPU's, considering the configuration of the hardware.

The wireless communication module 86 establishes wireless communication with the wireless communication module 48 of the input device 20. This allows the input device 20 to transmit, to the game device 10, status information of the operation buttons and the information on the detection values of the 3-axis acceleration sensor 56 and the 3-axis gyro sensor 58 at a predetermined interval.

The wireless communication module 86 receives the status information of the operation buttons and the information on the detection values of the sensors and provides the information to the input reception unit 88. The input reception unit 88 separates the status information of the operation buttons and the information on the detection values of the sensors and passes the information sets over to the application processing unit 100. The application processing unit 100 receives the status information of the operation buttons and the information on the detection values of the sensors as game operation instructions. The application processing unit 100 treats the information on the detection values of the sensors as information on the posture of the input device 20.

The frame image acquisition unit 80 is configured as a USB interface and acquires a frame image from the image-capturing device 14 at a predetermined imaging rate (for example, 30 frames per second). The image processing unit 82 extracts the image of the illuminator from the frame image. The image processing unit 82 identifies the position and the size of the image of the illuminator in the frame image. The lighting-up of the illuminator 22 of the input device 20 in a color that is unlikely used in the user's environment allows the image processing unit 82 to extract the image of the illuminator from the frame image with a high degree of accuracy. The image processing unit 82 may perform a binarization process on data of the frame image by using a predetermined threshold value so as to generate a binarized image. The pixel value of a pixel having a brightness that is larger than the threshold value is coded to be "1," and the pixel value of a pixel having a brightness that is the threshold value or below is coded to be "0" by the binarization process. The lighting-up of the illuminator 22 in brightness that exceeds the predetermined threshold value allows the image processing unit 82 to identify the position and the size of the image of the illuminator from the binarized image. For example, the image processing unit 82 identifies both the coordinates of the center of gravity of the illuminator image in the frame image and the radius of the image of the illuminator.

The device information derivation unit 84 derives the positional information of the input device 20 viewed from the image-capturing device 14 based on the position and size of the image of the illuminator that are identified by the image processing unit 82. The device information derivation unit 84 derives positional coordinates in camera coordinates based on the coordinates of the center of gravity of the illuminator image and also derives information on a distance from the image-capturing device 14 based on the radius of the illuminator image. The positional coordinate and the distance information constitute the positional information of the input device 20. The device information derivation unit 84 derives the positional information of the input device 20 for each frame image and passes the positional information over to the application processing unit 100. The application processing unit 100 receives the positional information of the input device 20 as a game operation instruction.

The application processing unit 100 progresses the game based on the positional information and the posture information of the input device 20 and on the status information of the operation buttons and generates an image signal that indicates the processing result of the game application. The image signal is transmitted from the output unit 90 to the display device 12 and then output as a display image.

Figure 5:
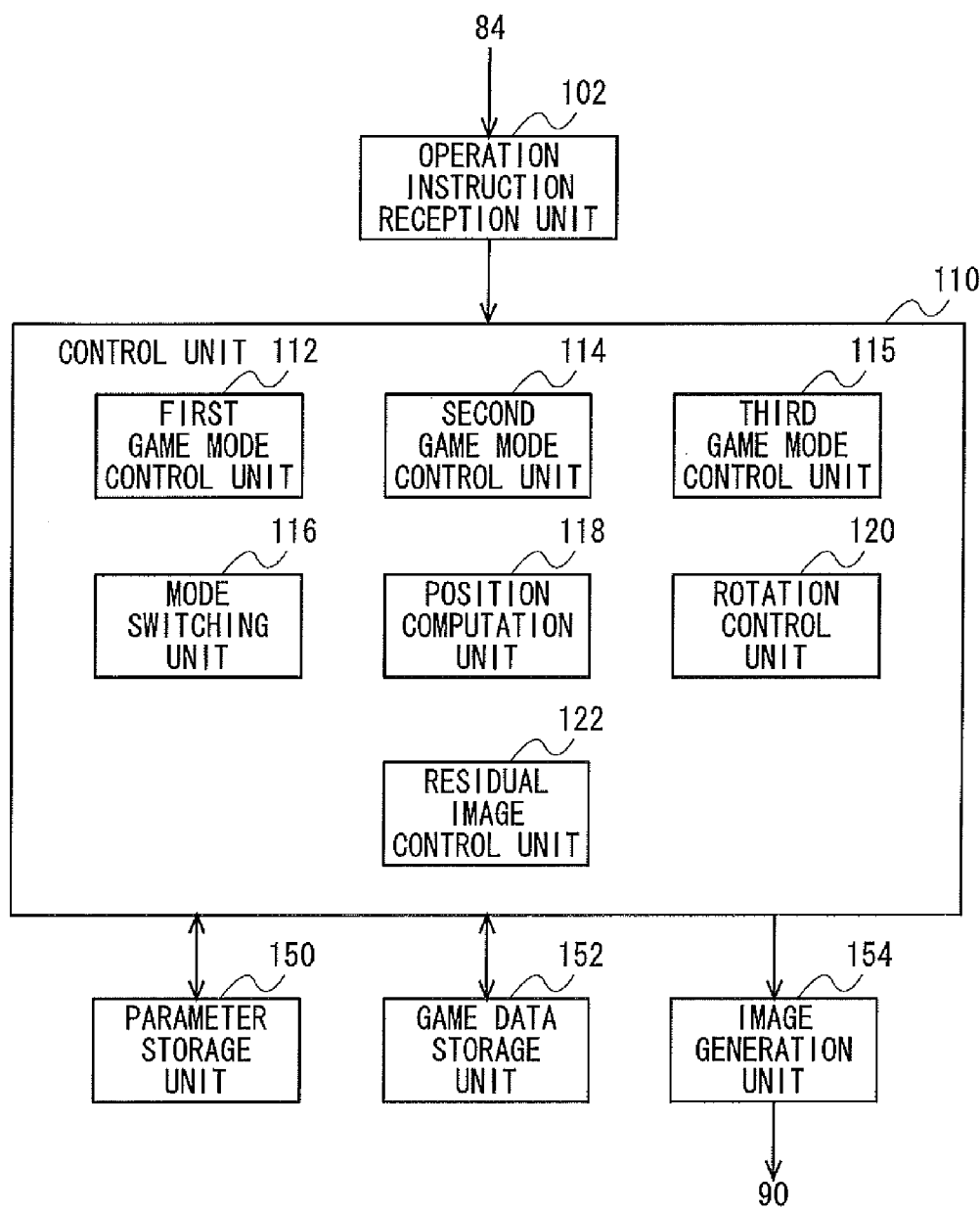
FIG. 5 is a diagram illustrating the configuration of an application processing unit.

FIG. 5 illustrates the configuration of an application processing unit 100. The application processing unit 100 is provided with an operation instruction reception unit 102, a control unit 110, a parameter storage unit 150, a game data storage unit 152, and an image generation unit 154.

The operation instruction reception unit 102 receives, each as an operation instruction, the positional information of the input device 20 from the device information derivation unit 84 and the posture information and the status information of the operation buttons from the input reception unit 88. The control unit 110 executes a game program based on the operation instruction received by the operation instruction reception unit 102 so as to progress the game. The parameter storage unit 150 stores parameters necessary for the progress of the game. The game data storage unit 152 stores three-dimensional data of an object, etc., that constitute the ethos of the game. The image generation unit 154 generates a display screen by adding various types of information to a game field image rendered by the control unit 110.

The control unit 110 includes a first game mode control unit 112, a second game mode control unit 114, a third game mode control unit 115, a mode switching unit 116, a position computation unit 118, a rotation control unit 120, and a residual image control unit 122.

The first game mode control unit 112 controls a first game mode where an enemy character is captured by manipulating a net. The second game mode control unit 114 controls a second game mode where an enemy character is shot down by manipulating a slingshot. The mode switching unit 116 switches between the first game mode and the second game mode in accordance with an instruction from the player. As described hereinafter, the position computation unit 118 computes the position of the net during the first game mode and the position of a target for the slingshot during the second game mode according to the operation of the input device 20 by the player. The rotation control unit 120 rotates an object or the like in the game in accordance with the rotation around the longer axis of the input device 20. The residual image control unit 122 displays the residual image of the image of an object or the like that is to be moved.

Figure 6:
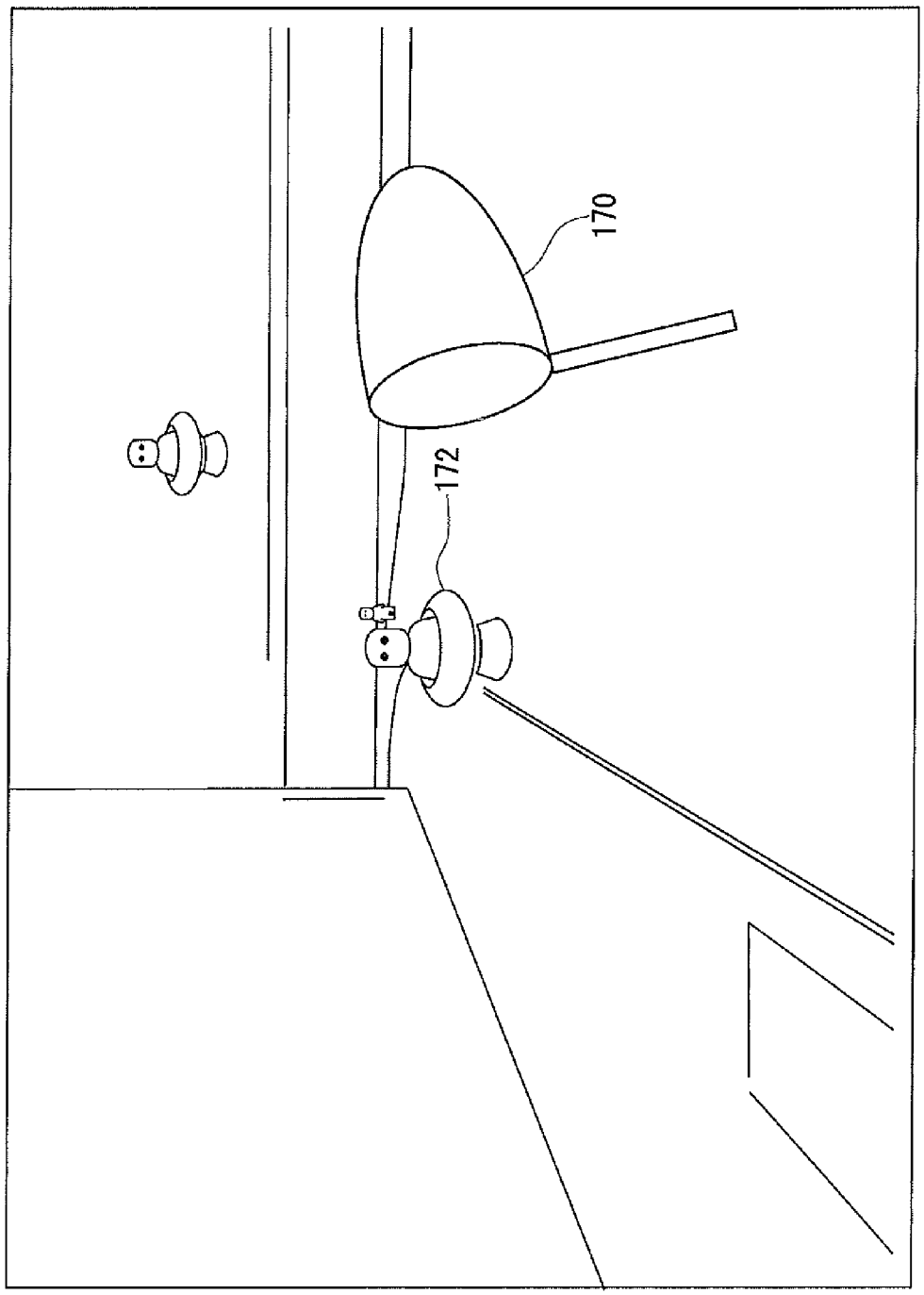
FIG. 6 is a diagram illustrating an example of a game screen controlled by the game device according to an embodiment.

FIG. 6 illustrates an example of a game screen controlled by the game device according to the embodiment. FIG. 6 illustrates a game screen during the first game mode. The game screen displays an enemy character 172 and a net 170 for capturing the enemy character 172. The first game mode control unit 112 causes the image generation unit 154 to generate the image of the game field and, by notifying the image generation unit 154 of the position of an enemy character, to generate the image of the enemy character. The image generation unit 154 reads out, from the game data storage unit 152, the data of the object provided in the game field and set the viewpoint position or the line of sight so as to render the image of the game field. The image generation unit 154 also loads the data of the enemy character from the game data storage unit 152 and arrange the enemy character at the position as notified by the first game mode control unit 112 so as to perform rendering. The first game mode control unit 112 moves the enemy character 172 based on a predetermined algorithm. The first game mode control unit 112 also controls the position and the posture of the net 170 based on the positional information and the posture information of the input device 20.

Figure 7:
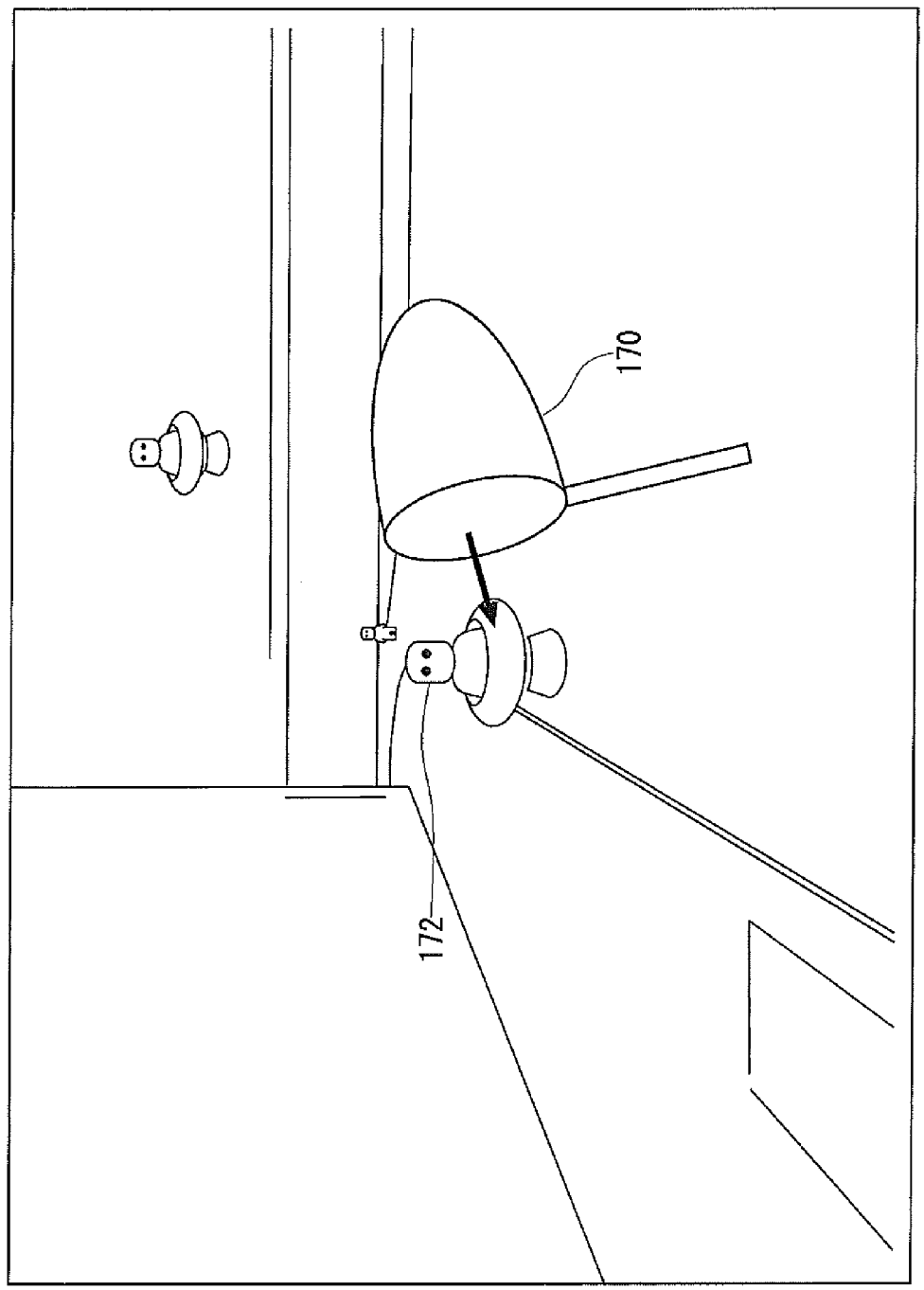
FIG. 7 is a diagram illustrating an example of a game screen controlled by the game device according to the embodiment.

FIG. 7 illustrates an example of a game screen controlled by the game device according to the embodiment. The player moves the net 170 so as to capture the enemy character 172 in the net 170 by moving the position of the input device 20 or by tilting the input device 20. The first game mode control unit 112 determines, based on the positional relationship between the frame of the net 170 and the enemy character 172, whether or not the enemy character 172 is being captured in the net 170.

Figure 8:
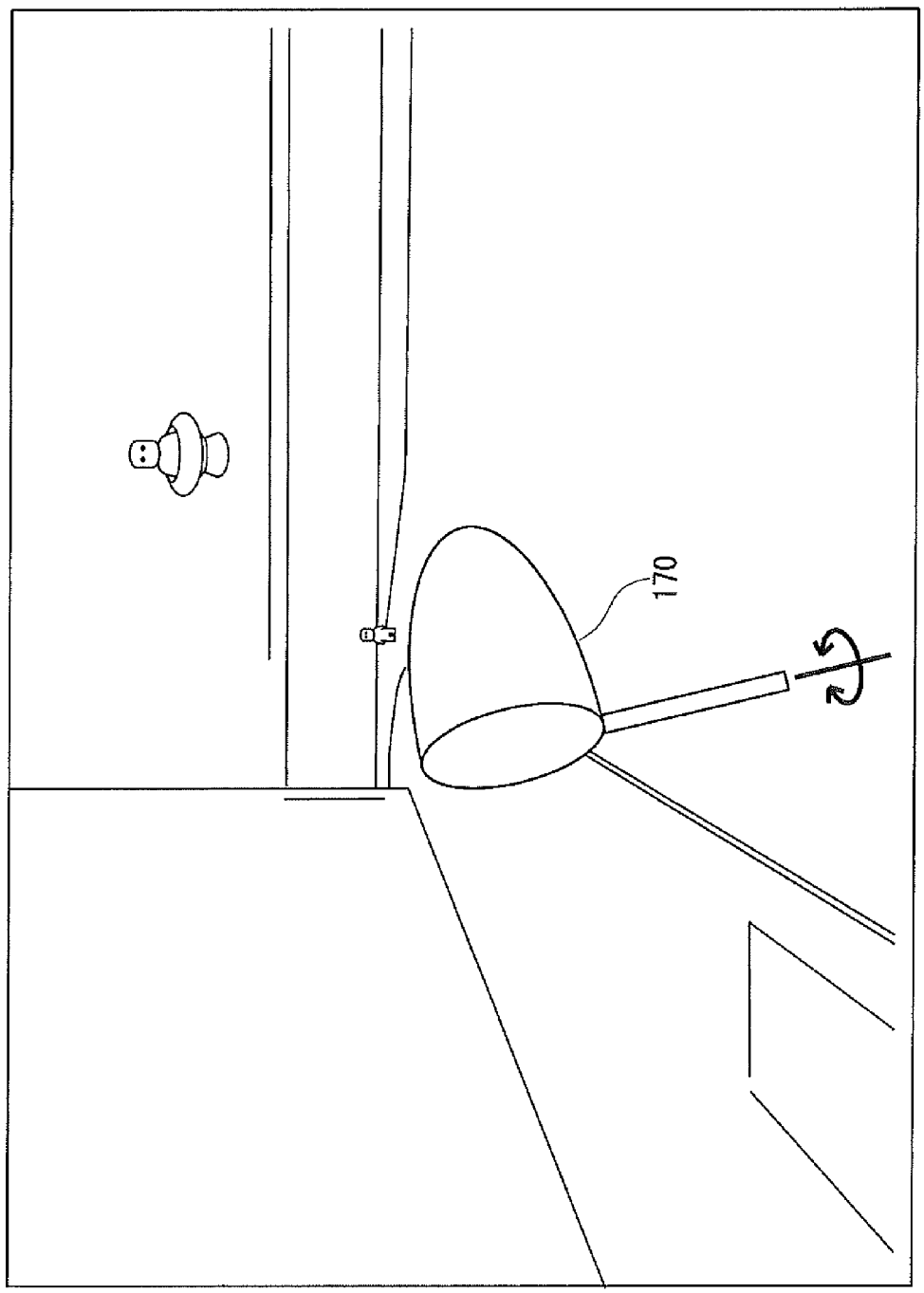
FIG. 8 is a diagram illustrating an example of a game screen controlled by the game device according to the embodiment.

FIG. 8 illustrates an example of a game screen controlled by the game device according to the embodiment. The first game mode control unit 112 deletes the enemy character from the screen when the enemy character is determined to be being captured by the net 170. The first game mode control unit 112 awards predetermined points to the player at this time. In examples shown in FIGS. 7 and 8, the enemy character 172 is determined to be being captured in the net 170 since the net 170 has been moved such that the enemy character 172 enters into the net 170 through the frame. However, the first game mode control unit 112 determines that the enemy character 172 is not being captured in the net 170 if the net 170 bumps into the enemy character 172 from a different direction.

During the first game mode, the player can rotate, by rotating the input device 20 around the longer axis thereof, the net 170 using the handle thereof as a rotation axis. In addition to moving the net 170 toward the enemy character 172, the player also has to align the direction of the net 170.

Figure 9:
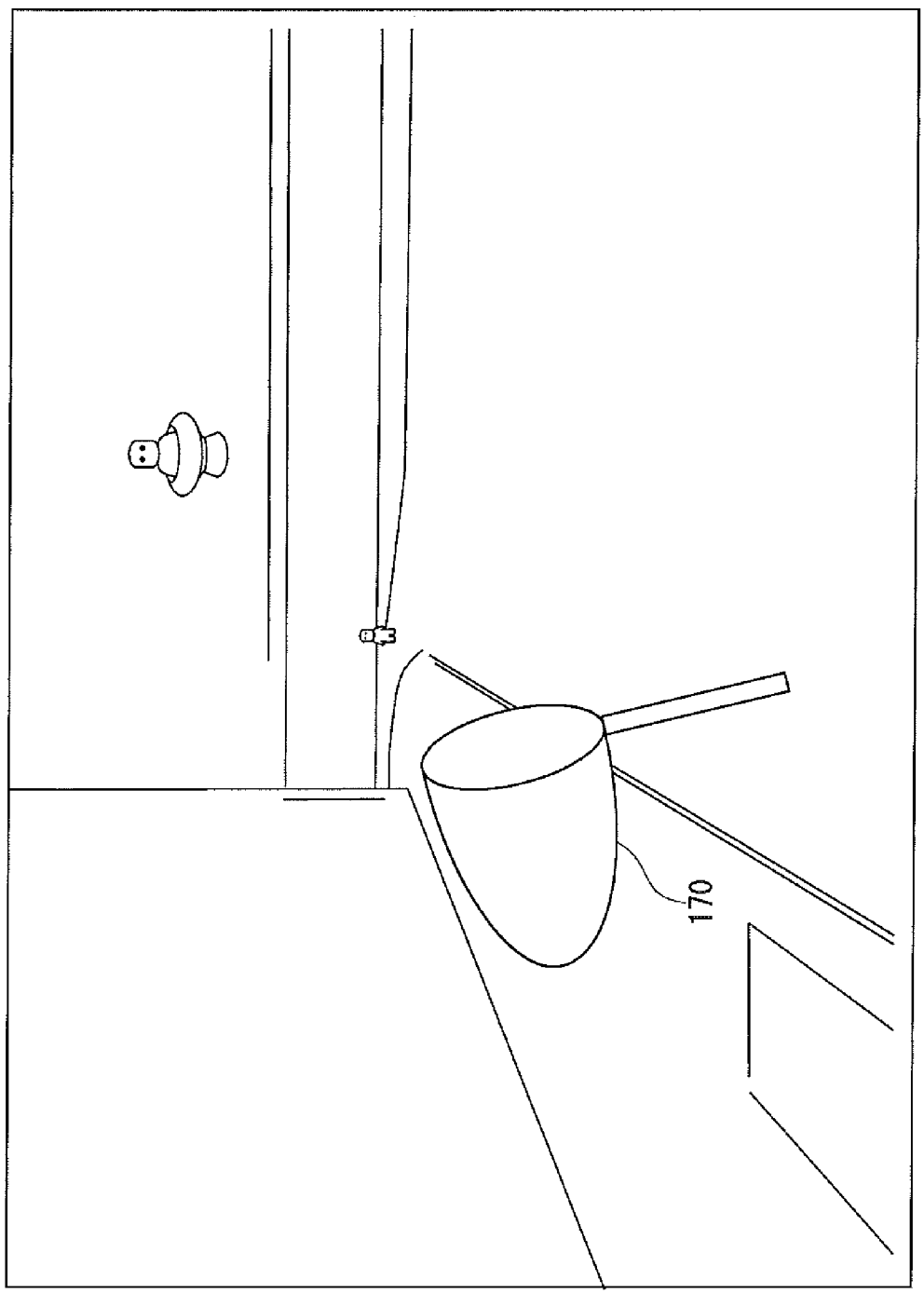
FIG. 9 is a diagram illustrating an example of a game screen controlled by the game device according to the embodiment.

FIG. 9 illustrates an example of a game screen controlled by the game device according to the embodiment. When the player rotates the input device 20 around the longitudinal axis in the state shown in FIG. 8, the rotation control unit 120 rotates the net 170 by an angle that corresponds to the amount of rotation around the longitudinal axis of the input device 20. The state after the rotation is shown in FIG. 9.

Figure 10:
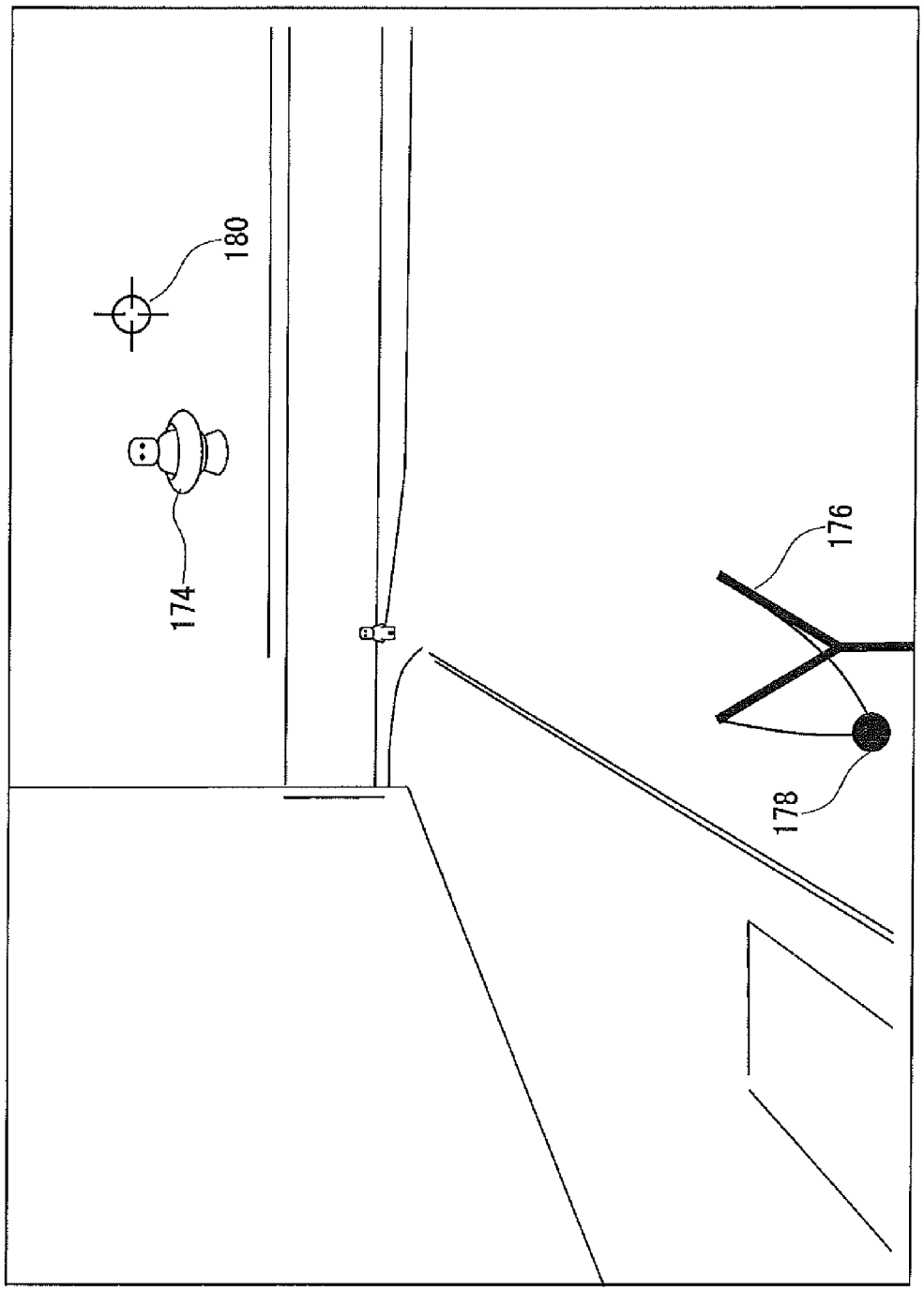
FIG. 10 is a diagram illustrating an example of a game screen controlled by the game device according to the embodiment.

FIG. 10 illustrates an example of a game screen controlled by the game device according to the embodiment. FIG. 10 illustrates a game screen during the second game mode. When the player presses the operation button 40 of the input device 20, the mode switching unit 116 switches a game mode between the first game mode and the second game mode. The player can switch a weapon, which is used for defeating an enemy character, between a net and a slingshot by pressing the operation button 40 of the input device 20.

Just as the first game mode control unit 112 does, the second game mode control unit 114 causes the image generation unit 154 to generate the image of a game field and the image of an enemy character. The second game mode control unit 114 moves an enemy character 174 based on a predetermined algorithm. The second game mode control unit 114 controls the position of a target 180 of a ball 178 of the slingshot 176 based on the positional information and the posture information of the input device 20. The second game mode control unit 114 throws the ball 178 of the slingshot 176 toward the target 180 when the player presses the operation button 36 of the input device 20. The second game mode control unit 114 determines, based on the positional relationship between the target 180 and the enemy character 174, whether or not the ball 178 has hit the enemy character 174. When the ball is determined to have hit the enemy character 174, the second game mode control unit 114 deletes the enemy character 174 and awards the player predetermined points.

A description will now be given of a method of computing a position by the position computation unit. The position computation unit 118 computes a position by using methods that are different in the first game mode and the second game mode. A description is first given of a method of computing the position of a target during the second game mode.

Figure 11:
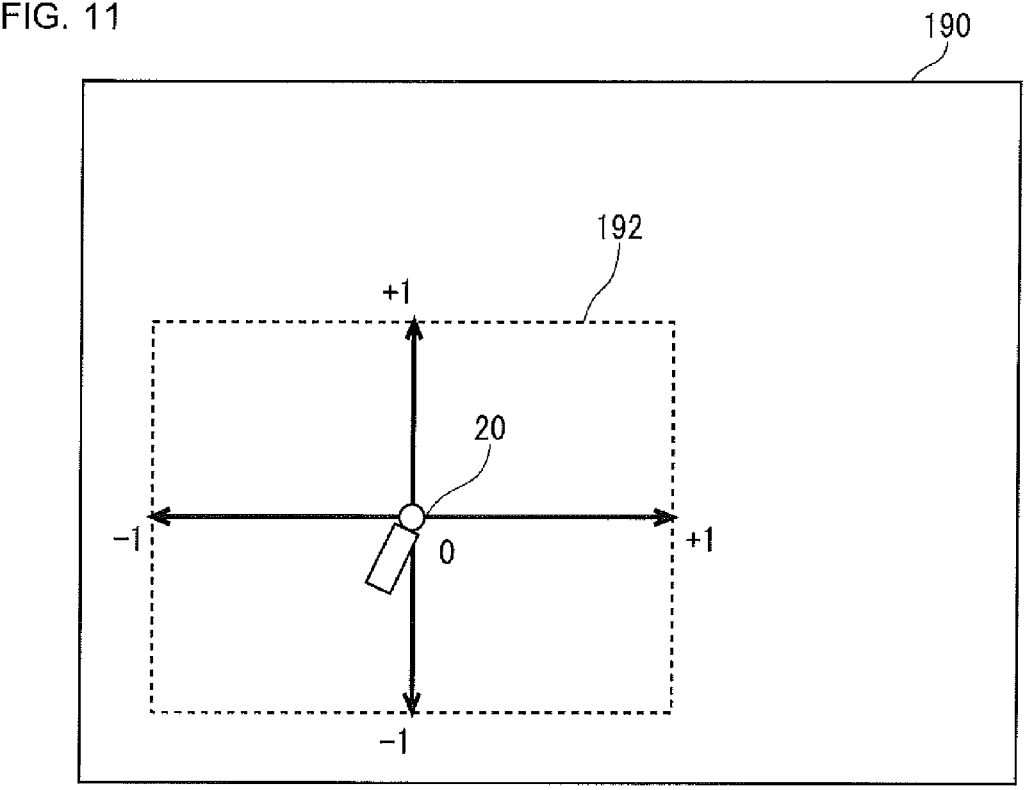
FIG. 11 is a diagram explaining a method of computing a position by a position computation unit.

FIG. 11 is a diagram explaining a method of computing a position by the position computation unit. The position computation unit 118 calibrates the position and the posture of the input device 20 before the start of the game. The position computation unit 118 presents, to the player, a calibration screen for determining the initial position and the initial posture of the input device 20. The position computation unit 118 determines the position and the posture of the input device 20 when the player enters a predetermined operation button as the initial position and the initial posture, and stores the initial position and the initial posture in the parameter storage unit 150. The position computation unit 118 computes the position of an object based on the amount of the displacement in the position and the posture of the input device 20 while using, as an origin, the position of the object when the position and the posture of the input device 20 are the initial position and the initial posture, respectively, in a coordinate system whose origin is the center of the display screen.

Figure 12:
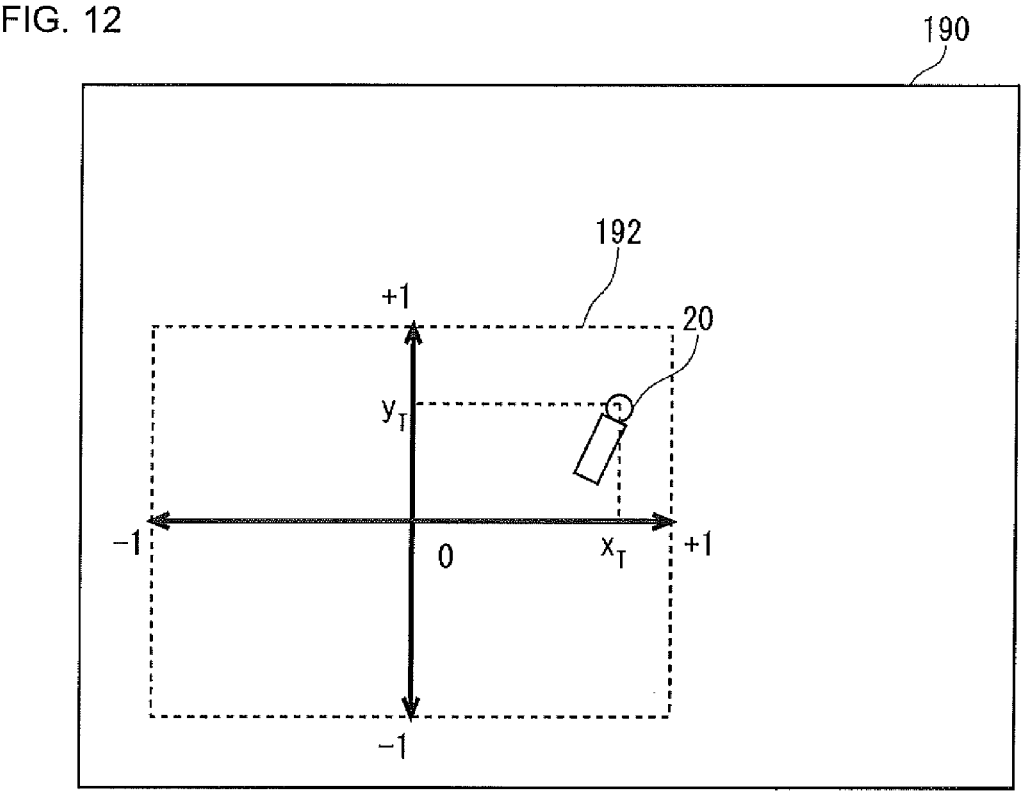
FIG. 12 is a diagram explaining a method of computing a position by the position computation unit.
Figure 13:
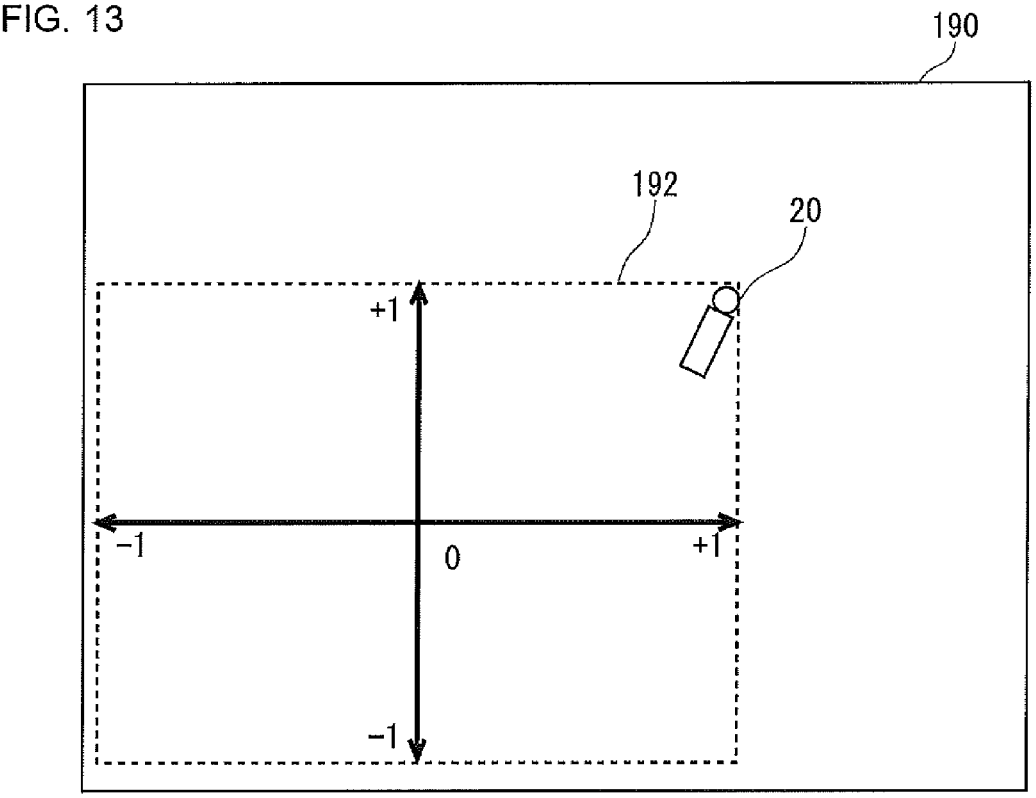
FIG. 13 is a diagram explaining a method of computing a position by the position computation unit.

The position computation unit 118 sets a rectangle 192 of a predetermined size whose center is the initial position of the input device 20 in an imaging range 190 of the image-capturing device 14 and uses the rectangle 192 as a reference for computing the amount of the displacement in the position of the input device 20. The position computation unit 118 quantifies the amount of the displacement of the input device 20 from the initial position such that the upper end and the lower end of the rectangle 192 are set to be +1 and −1, respectively, in the vertical direction and such that the right end and the left end of the rectangle 192 are set to be +1 and −1, respectively, in the horizontal direction. As shown in FIG. 12, the position computation unit 118 then computes both a displacement amount xT of the position in the horizontal direction and a displacement amount yT of the position in the vertical direction. The position computation unit 118 stores the computed displacement amounts xT and yT in the parameter storage unit 150. If an input device 20 exists outside the rectangle 192 being above or below the rectangle 192, the position computation unit 118 may set xT and yT to be a value larger than +1 or a value smaller than −1 or to be +1 when the value is larger than +1 and to be −1 when the value is smaller than −1. Alternatively, the rectangle 192 may be enlarged such that the input device 20 is included in the range from −1 to +1, as shown in FIG. 13. In the case of an example shown in FIG. 12, the size of the rectangle 192 may be changed back to its original size when the input device 20 goes back inside the original rectangle 192. The size of the rectangle 192 may be gradually reduced at this time.

The rectangle 192 may be a rectangle where the ratio of the length in a transverse direction to the length in a longitudinal direction is 4:3, which is a general imaging range of the image-capturing device 14 or may be a rectangle where the ratio of the length in a transverse direction to the length in a longitudinal direction is 16:9, which is a general imaging range of the display device 12. The rectangle 192 is used as a standard for the sensitivity when a displacement amount of the position of the input device 20 is converted into the amount of movement of the position of an object in the display screen.

Figure 14:
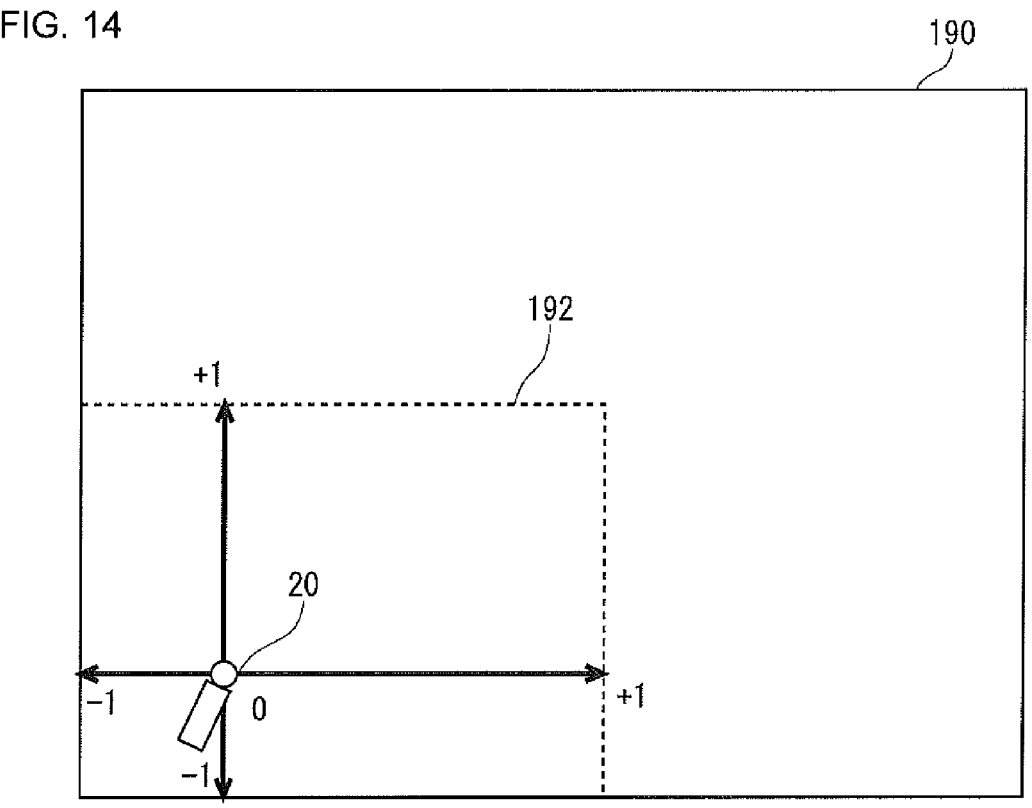
FIG. 14 is a diagram explaining a method of computing a position by the position computation unit.

The position computation unit 118 may set the rectangle 192 to be fit inside the imaging range 190 as shown in FIG. 14 when the player set the initial position near the peripheral border of the imaging range 190 during the calibration. In this case, the sensitivity for quantifying the displacement amount of the position may be different in the upper side and the lower side in the vertical direction and may be different in the right side and the left side in the horizontal direction since the initial position does not match the center of the rectangle 192. As another example, the center of the rectangle 192 shown in FIG. 14 may be set to be the initial position. In this case, the calibrated position and the initial position do not match. The player may be warned to set the initial position to be close to the center of the imaging range 190 when the player tries to set the initial position near the peripheral border of the imaging range 190.

The position computation unit 118 may determine, based on a distance between the input device 20 and the image-capturing device 14, the sensitivity used when a displacement amount of the position of the input device 20 is converted into the amount of movement of the position of the object in the display screen. The smaller the distance between the input device 20 and the image-capturing device 14 becomes, the more the input device 20 moves on an image captured by the image-capturing device 14, even when the amount of the displacement of the input device 20 by the player is small. Therefore, the position computation unit 118 may lower the sensitivity by, for example, enlarging the rectangle 192 when the distance between the input device 20 and the image-capturing device 14 is small. With this, an operational environment can be provided where the feeling of operation does not change much even when the distance between the input device 20 and the image-capturing device 14 is changed.

Figure 15:
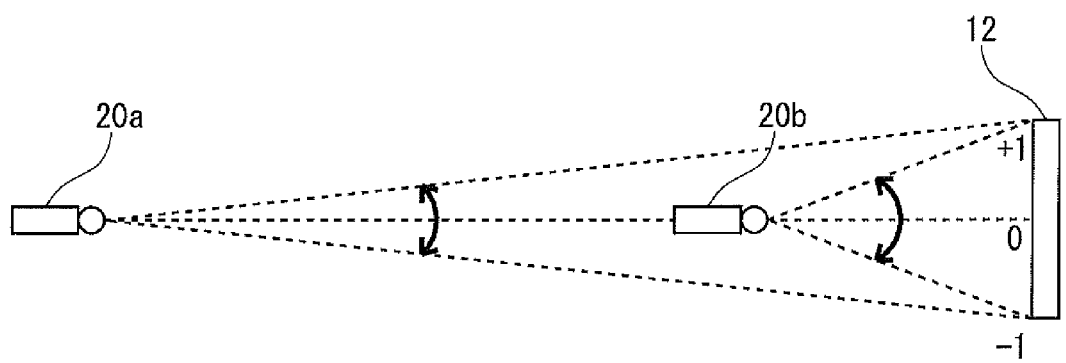
FIG. 15 is a diagram explaining a method of computing a position by the position computation unit.

FIG. 15 is a diagram explaining a method of computing a position by the position computation unit. The position computation unit 118 determines, on the premise that the input device 20 was directed to the display device 12 at the time of the calibration, an integrated value of a gyro value (angular velocity) obtained from the initial posture to be the current posture information of the input device 20. The position computation unit 118 quantifies a displacement amount of the inclination of the input device 20 in a unit of an angle required for panning the entire imaging range of the image-capturing device 14 or the entire display range of the display device 12 by the input device 20 at the position determined in advance by the calibration. As shown in FIG. 15, the closer the position of the input device 20 is to the image-capturing device 14 or the display device 12, the larger the angle becomes that is required for panning the entire imaging range or the entire display range. When the size of the display range of the display device 12 can be obtained, the position computation unit 118 may obtain the angle required for panning the entire display range based on the size of the display range and the distance from the display device 12 or the image-capturing device 14 to the input device 20 and quantify the displacement amount of the inclination of the input device 20 by using the value thereof as a standard. If the size of the display range of the display device 12 is not known, the angle used as a unit may be determined in advance. In this case, the farther the input device 20 moves apart from the image-capturing device 14, the larger the displacement amount of the inclination is set to be evaluated by multiplying the value, which is obtained by dividing the obtained inclination of the input device 20 by the angle used as a unit, by the distance between the image-capturing device 14 and the input device 20. The position computation unit 118 stores computed displacement amounts xR and yR of the inclination in the parameter storage unit 150.

The position computation unit 118 reads out the displacement amounts xT1 and yT1 of the latest position and the displacement amounts xT0 and yT0 of the position obtained one frame earlier. The position computation unit 118 then computes the respective weighted averages after assigning weights to the displacement amounts and sets the respective weighted averages to be the displacement amounts xT and yT of the current position as follows:

$$xT = \alpha xT1 + (1-\alpha)xT0$$

$$yT = \alpha yT1 + (1-\alpha)yT0$$

where $\alpha$ is a value from 0 to 1 and may be, for example, 0.4.

Similarly, the position computation unit 118 reads out the displacement amounts xR1 and yR1 of the latest inclination and the displacement amounts xR0 and yR0 of the inclination obtained one frame earlier. The position computation unit 118 then computes the respective weighted averages after assigning weights to the displacement amounts and sets the respective weighted averages to be the displacement amounts xR and yR of the current inclination as follows:

$$xR = \alpha xR1 + (1-\alpha)xR0$$

$$yR = \alpha yR1 + (1-\alpha)yR0$$

where $\alpha$ is a value from 0 to 1 and may be, for example, 0.4.

As described above, computing the current displacement amounts in consideration of the previous displacement amounts as well as the latest displacement amounts prevents misalignment of the position or inclination of the input device 20 held by the player from being directly incorporated into the position of the net, the target, etc., while reducing the misalignment.

The position computation unit 118 computes, by adding the displacement amounts xT and yT of the current position and the displacement amounts xR and yR of the current inclination after assigning weights, positions X and Y in the game field as follows:

$$x = \beta_1 xT + \beta_2 xR$$

$$y = \beta_1 yT + \beta_2 yR$$

The position computation unit 118 sets a weight β2, which is to be assigned to the displacement amount of the inclination, to be larger than a weight β1, which is to be assigned to the displacement amount of the position. The position computation unit 118 sets β1 and β2 to be, for example, 0.8 and 1.5.

The position computation unit 118 stores computed x and y in the parameter storage unit 150. When generating the image of the net or the target, the image generation unit 154 reads out, from the parameter storage unit 150, the previous position of the net or the target in the predetermined range and displays the residual image of the net or the target at the previous position. The image generation unit 154 may display the residual image in a translucent condition by lowering the ☐ value. Instead of displaying the residual images of all frames in the previous predetermined range, the image generation unit 154 may display a reduced number of residual images for each predetermined frame. Instead of storing the positions of all the frames in the parameter storage unit 150, the position computation unit 118 may store a reduced number of positions for each predetermined frame.

The input device 20 functions as a net during the first game mode, and the input device 20 has a function of moving a target during the second game mode. Therefore, the average posture of the input device 20 operated by the player is different in the first game mode and the second game mode. Therefore, the mode switching unit 116 changes the setting of the initial posture when switching a game mode between the first game mode and the second game mode. In the present embodiment, the offset value of he initial posture in the second game mode may preferably be from 30 to 60 degrees in a vertically upward direction and, more preferably, 50 degrees. In other words, the displacement amount of the position is computed using, as the initial position, the position of the input device 20 determined in advance by calibration, and the inclination from a horizontal direction and a vertical direction obtained using the initial posture as a standard is set to be the displacement amount of the inclination in the first game mode. With regard to the vertical direction, the displacement amount of the inclination is computed using, as a standard, the posture obtained by tilting the input device 20 in a vertically upward direction from a horizontal direction in the second game mode. This allows the player to operate the input device 20 while feeling like shooting a gun by using the input device 20 like the grip of a gun and the operation button 40 like the trigger of a gun. Since the net is in the condition of being tilted in an upward direction by around 50 degrees when the game mode is switched from the second game mode to the first game mode, a user-friendly operational environment can be provided. The mode switching unit 116 sets the initial posture in a vertical direction to be tilted by 50 degrees in an upward direction when switching the game mode from the first game mode to the second game mode. The mode switching unit 116 sets the initial posture in a vertical direction to be in a horizontal direction when switching the game mode from the second game mode to the second game mode. The mode switching unit 116 sets, as an initial value, the posture of the input device 20 when the game mode is switched to the second game mode.

A description is now given of a method of computing the position of a net during the first game mode. In the first game mode, the position computation unit 118 determines the position of the net based on the positional information of the input device 20 whose image has been captured by the image-capturing device 14. In the method of computing the position during the second game mode, the position computation unit 118 may compute the position of the net in consideration of only the displacement amount of the position or may compute the position of the net as in the case of the second game mode. In the first game mode, the posture of the net is controlled by the rotation control unit 120 based on the information acquired from the 3-axis gyro sensor 58. Also, the first game mode control unit 112 controls the movement of swinging the net based on the information acquired from the 3-axis gyro sensor 56. In the second game mode, only the position of the target is controlled. However, in the first game mode, the posture, movement, etc., of the net as well as the position of the net are required to be controlled. Thus, the position computation unit 118 computes the position of an object by using methods that are different in the first game mode and the second game mode.

In the above example, the position of the target is computed by using the absolute value of the displacement amount of the position of the input device 20 obtained by using, as a standard, the initial position of the input device 20 determined by calibration. However, the position of the target may be computed by using the relative displacement amount from the position of the input device 20 at the time of the previous computation. The position computation unit 118 may set, as the amount of movement of the position of the target in a coordinate system of the display screen, a value obtained by multiplying a predetermined value indicating a sensitivity by a difference between the position of the input device 20 in a previous frame and the position of the input device in the current frame.

Figure 16:
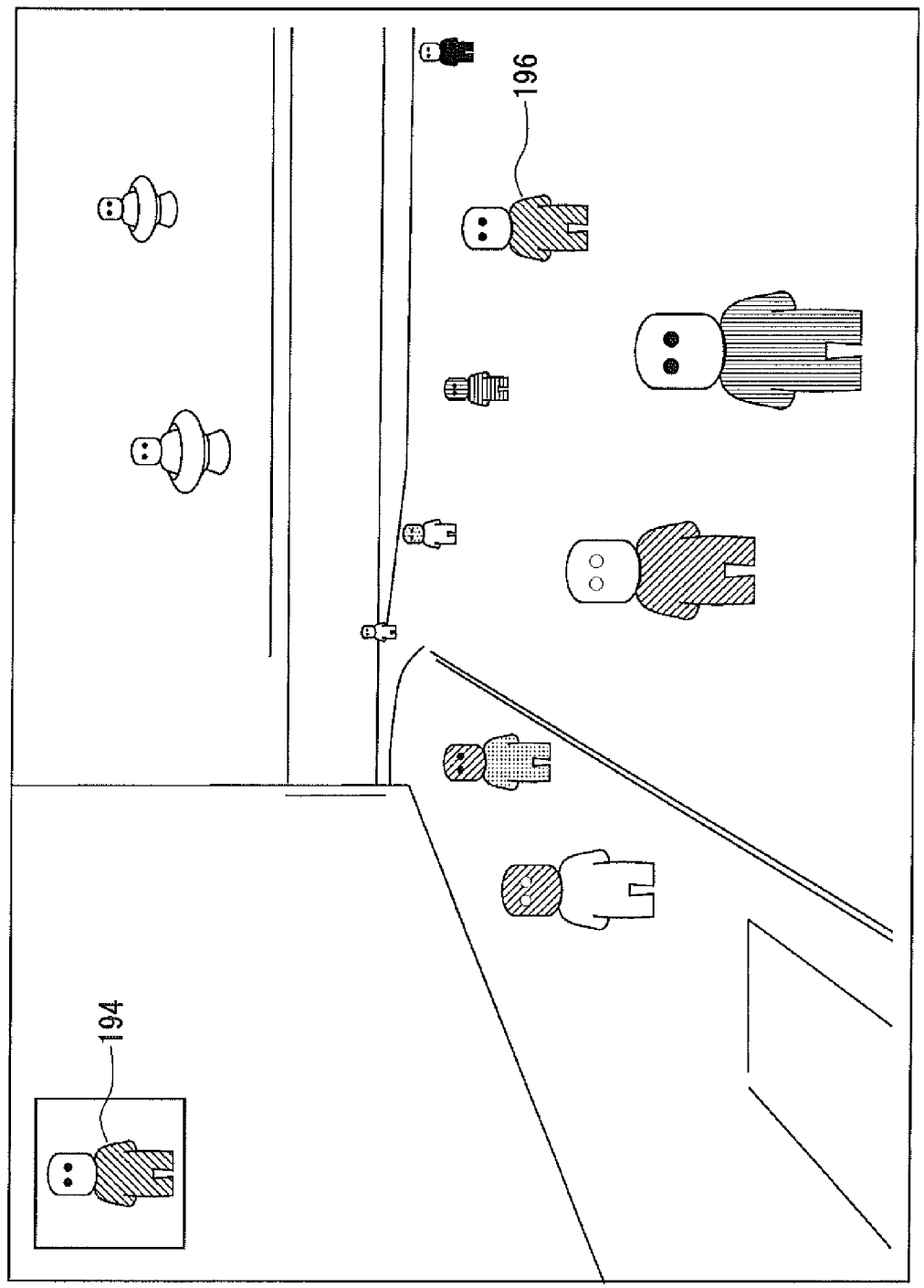
FIG. 16 is a diagram illustrating an example of a game screen controlled by the game device according to the embodiment.

FIG. 16 illustrates a game screen during a third game mode. The third game mode control unit 115 controls a game where a specified character is found among a plurality of characters displayed on the screen and is shot up. In addition to displaying on the screen the image of a character 194 to be shot by the player, the third game mode control unit 115 arranges, in a game field, a character 196, which is the same character as the character 194, and a plurality of characters that are different from the character 194 in the color, shape, etc., and causes the image generation unit 154 to generate the image of a game field.

Figure 17:
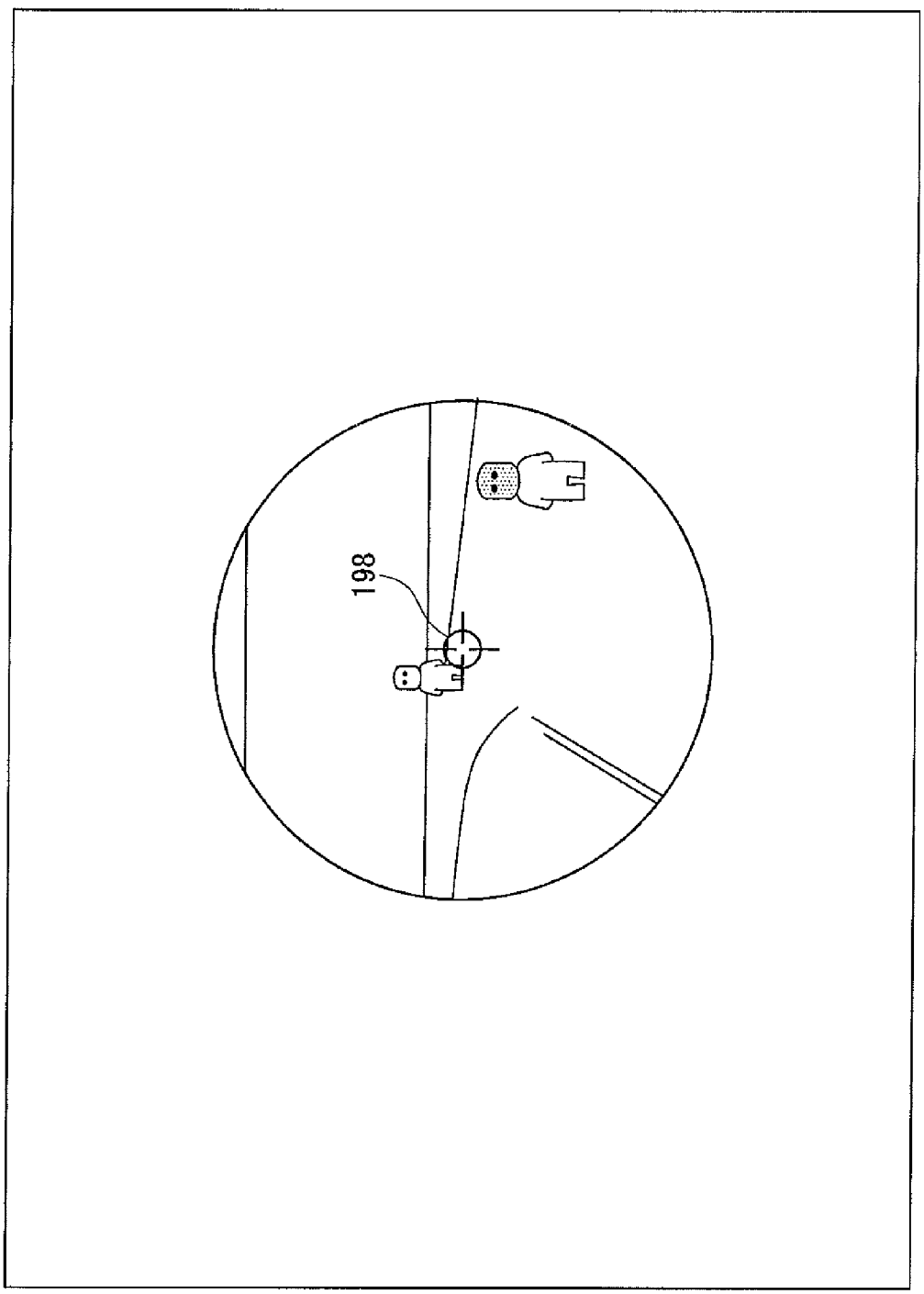
FIG. 17 is a diagram illustrating an example of a game screen controlled by the game device according to the embodiment.

FIG. 17 illustrates a game screen during a third game mode. In the third game mode, the input device 20 is used like a rifle, and the overall view of the game field shown in FIG. 16 is displayed when the input device 20 is upwardly directed. The enlarged view shown in FIG. 17 is displayed when the input device 20 is directed to the screen, in other words, to the image-capturing device 14. The game screen shown in FIG. 17, which represents a view obtained when looking through a gun-sight, displays an enlarged view of the game field inside a circular area that is narrower than the screen. The player moves the input device 20 in an upward direction so that the overall view is displayed and checks the rough position of the character 196. The player moves the input device 20 to face the screen so that the enlarged view is displayed, moves a display area of the enlarged view to a position where the character 196 exists by using the input device 20, and shoots while aiming at the character 196. As described above, moving the input device 20 in an upward direction corresponds to looking away from the gun-sight so as to view the entire game field, and moving the input device 20 to face the screen corresponds to looking through the gun-sight. Thus, an intuitively understandable interface can be provided.

The third game mode control unit 115 prompts the player to hold the input device 20 in an upward direction before the start of a game. When detecting that the input device 20 is upwardly directed, the third game mode control unit 115 displays the overall view shown in FIG. 16 and starts the game. When detecting that the inclination of the input device 20 from the vertically upward direction exceeds a predetermined angle such that the input device 20 is inclined to be nearly horizontal during the display of the overall view, the third game mode control unit 115 switches the display to the enlarged view shown in FIG. 17. The third game mode control unit 115 sets a viewpoint position at a predetermined position that is closer to the game field than a viewpoint position at the time of rendering the overall view at this time. The third game mode control unit 115 then sets a predetermined line of sight, for example, the same line of sight as that used at the time of rendering the overall view so that the image generation unit 154 renders the enlarged view. The third game mode control unit 115 may set the line of sight in accordance with the posture of the input device 20 at the time of switching the display to the enlarged view. For example, regarding the horizontal direction, the third game mode control unit 115 may set the line of sight in accordance with an angle with respect to a straight line that connects the input device 20 and the image-capturing device 14.

The position computation unit 118 performs calibration using the position and the posture of the input device 20 at this time as a standard and computes the position of an aiming point 198 in the game field based on the position and the posture of the input device 20 as in the case in the first game mode or the second game mode. The third game mode control unit 115 computes, based on the current position of the aiming point 198 that was computed, a line of sight used at the time of rendering the enlarged view such that the position of the aiming point 198 is at the center in the enlarged view and notifies the image generation unit 154 of the computed line of sight. This allows the player to move the display area of the enlarged view vertically or horizontally in the game field by moving or tilting the input device 20 vertically or horizontally so as to vertically or horizontally move the position of the aiming point 198.

In accordance with the distance between the input device 20 and the image-capturing device 14, the third game mode control unit 115 moves viewpoint position used at the time of rendering the enlarged view and notifies the image generation unit 154 of the moved viewpoint position. In other words, when the distance between the input device 20 and the image-capturing device 14 becomes shorter or longer than the distance at the time of switching the display to the enlarged view, the viewpoint position is moved closer to or farther away from the game field, respectively. This allows the player to zoom in or zoom out the enlarged view by moving the input device 20 closer to or farther away from the image-capturing device 14, respectively.

When detecting that the inclination of the input device 20 from the vertically upward direction falls below a predetermined angle such that the input device 20 is inclined to be nearly vertically upward during the display of the enlarged view, the third game mode control unit 115 switches the display to the overall view shown in FIG. 16. The calibration of the position and the posture of the input device 20 is reset at this time, and the calibration is performed again when the enlarged view is displayed next time.

When the inclination of the input device 20 from the vertically upward direction at the time of switching the view from the overall view to the enlarged view and the inclination at the time of switching the view from the enlarged view to the overall view are set to be a first threshold value and a second threshold value, respectively, the first threshold value is preferably larger than the second threshold value. For example, the first threshold value may be close to 90 degrees such that the input device 20 is almost horizontal, and the second threshold value may be close to zero degree such that the input device 20 is almost vertically upward. As described above, providing hysteresis in switching from the overall view to the enlarged view and in switching from the enlarged view to the overall view prevents the display from being unintentionally switched between the overall view and the enlarged view while the player moves the gun-sight by operating the input device 20.

The position computation unit 118 may sets the same sensitivity used when the aiming point is moved regardless of the viewpoint position used at the time of rendering the enlarged view or may change the sensitivity according to the viewpoint position. In the former case, when the input device 20 is moved or tilted for the same amount, the aiming point moves more on the enlarged image as the enlarged image is zoomed in. Thus, an interface can be provided that represents the view similar to the one actually obtained by looking through the gun-sight. In the latter case, the movement of the aiming point on the enlarged view may be decreased by lowering the sensitivity at the time of moving the aiming point as the enlarged view is zoomed out by moving the viewpoint position closer to the game field. In this way, an interface can be provided that allows for easy aiming.

Described above is an explanation based on the exemplary embodiments of the present invention. The embodiment is intended to be illustrative only and it will be obvious to those skilled in the art that various modifications to constituting elements and processes could be developed and that such modifications are also within the scope of the present invention.

EXPLANATION OF REFERENCE NUMERALS 10 game device
110 control unit
112 first game mode control unit
114 second game mode control unit
115 third game mode control unit
116 mode switching unit
118 position computation unit
120 rotation control unit
122 residual image control unit
150 parameter storage unit
152 game data storage unit
154 image generation unit The present invention is applicable in a game device that controls a game by using the position and posture of an input device as an operation input.

The invention claimed is:

1. A game control program embedded in a non-transitory, computer-readable medium comprising:
   a module for acquiring a position of an input device for moving a position of a given object on a screen that is displayed on a display device;
   a module for acquiring an inclination of the input device; and
   a module for determining a position of the object on the screen based on a mathematical computation using as variables both a positional displacement amount of the input device from a predetermined position of origin and an inclination displacement amount of the input device from a predetermined posture of origin, wherein:
     in the module for determining the position of the object, the position of the object is determined based on a value obtained by adding the positional displacement amount and the inclination displacement amount after assigning respective weights to both the positional and inclination displacement amounts, and a weight assigned to the inclination displacement amount is set to be larger than a weight assigned to the positional displacement amount.

2. The game control program according to claim 1, wherein, in the module for acquiring the position of the input device, the acquired position of the input device is obtained by analyzing an image captured by an image-capturing device of the input device which is held by a player.

3. The game control program according to claim 2, wherein, in the module for determining the position of the object, the larger a distance between the input device and the image-capturing device or the display device becomes, the larger the inclination displacement amount of the input device is evaluated to be so as to determine the position of the object.

4. The game control program according to claim 1, further comprising:
a module for controlling a game with a plurality of different modes; and
a module for switching a mode of the game among the plurality of different modes, wherein,
in the module for determining the position of the object, an initial value is used as a standard for obtaining the positional displacement amount or the inclination displacement amount when the mode of the game is switched.

5. The game control program according to claim 1, further comprising:
a module for recording the positional displacement amount and the inclination displacement amount in a first storage unit,
wherein in the module for determining the position of the object, respective weighted averages of the previous positional displacement amount and inclination displacement amount, which are read out from the first storage unit, and the latest positional displacement amount and inclination displacement amount are set to be the positional displacement amount and the inclination displacement amount, respectively.

6. The game control program according to claim 1, further comprising:
a module for acquiring an amount of rotation around a longitudinal axis of the input device; and
a module for rotating the object based on the amount of rotation.

7. The game control program according to claim 1, further comprising:
a module for recording the position of the object in a second storage unit;
a module for displaying an image of the object at the position of the object on the screen; and
a module for displaying a residual image of the object at the previous position of the object stored in the second storage unit.

8. The game control program according to claim 1, wherein the object returns to an origin position on the screen whenever the input device is returned to both the predetermined position of origin and the predetermined posture of origin.

9. A game device comprising:
a position acquisition unit configured to acquire a position of an input device for moving a position of a given object on a screen displayed on a display device;
an inclination acquisition unit configured to acquire an inclination of the input device; and
a position computation unit configured to determine the position of the object on the screen based on a mathematical computation using as variables both a positional displacement amount of the input device from a predetermined position of origin and an inclination displacement amount of the input device from a predetermined posture of origin, wherein:
in the position computation unit, the position of the object is determined based on a value obtained by adding the positional displacement amount and the inclination displacement amount after assigning respective weights to both the positional and inclination displacement amounts, and
a weight assigned to the inclination displacement amount is set to be larger than a weight assigned to the positional displacement amount.

10. The game device according to claim 9, wherein the object returns to an origin position on the screen whenever the input device is returned to both the predetermined position of origin and the predetermined posture of origin.

11. A game control method, comprising:
acquiring a position of an input device using a processor for moving a position of a given object on a screen displayed on a display device;
acquiring an inclination of the input device using the processor; and
determining the position of the object on the screen using the processor based on a mathematical computation using as variables both a positional displacement amount of the input device from a predetermined position of origin and an inclination displacement amount of the input device from a predetermined posture of origin, wherein:
the step of determining the position of the object includes determining such position based on a value obtained by adding the positional displacement amount and the inclination displacement amount after assigning respective weights to both the positional and inclination displacement amounts, and
a weight assigned to the inclination displacement amount is set to be larger than a weight assigned to the positional displacement amount.

12. The game control method according to claim 11, wherein the object returns to an origin position on the screen whenever the input device is returned to both the predetermined position of origin and the predetermined posture of origin.

* * * * *